(12) United States Patent  
Okamoto et al.

(10) Patent No.: US 10,934,406 B2  
(45) Date of Patent: Mar. 2, 2021

(54) PREPREG TAPE AND USE THEREOF

(71) Applicant: Mitsubishi Chemical Corporation, Tokyo (JP)

(72) Inventors: Satoshi Okamoto, Tokyo (JP); Yukihiro Harada, Tokyo (JP); Atsushi Nohara, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 133 days.

(21) Appl. No.: 16/004,475

(22) Filed: Jun. 11, 2018

(65) Prior Publication Data

US 2018/0291165 A1 Oct. 11, 2018

Related U.S. Application Data

(63) Continuation of application No. PCT/JP2016/087616, filed on Dec. 16, 2016.

(30) Foreign Application Priority Data

Dec. 16, 2015 (JP) .................................. 2015-244811

(51) Int. Cl.
  *B32B 37/14* (2006.01)
  *C08J 5/24* (2006.01)
  (Continued)

(52) U.S. Cl.
  CPC .............. *C08J 5/24* (2013.01); *B29C 70/386* (2013.01); *B32B 5/02* (2013.01); *B32B 27/38* (2013.01);
  (Continued)

(58) Field of Classification Search
  CPC ...... C08J 5/24; C08J 2363/02; C08J 2363/04; B29C 70/386; B29K 2105/0881; B29K 2307/04
  See application file for complete search history.

(56) References Cited

U.S. PATENT DOCUMENTS

2010/0209642 A1* 8/2010 Tomioka ................. B32B 27/30
  428/36.9
2011/0184091 A1* 7/2011 Mizuki .............. C08G 59/4238
  523/428
(Continued)

FOREIGN PATENT DOCUMENTS

CN 104583310 A 4/2015
CN 106471047 A 3/2017
(Continued)

OTHER PUBLICATIONS

JP-2014015563-A Machine Translation (Year: 2014).*
(Continued)

*Primary Examiner* — Travis M Figg
(74) *Attorney, Agent, or Firm* — Morgan, Lewis & Bockius LLP

(57) ABSTRACT

A prepreg tape in which reinforcing fiber bundles are impregnated with a thermosetting resin composition, wherein the prepreg tape has a tack value measured at 23° C. at a plunger push pressure of 90 kPa of 5-40 kPa, a tack value measured at 45° C. and a plunger push pressure of 150 kPa of 35-100 kPa, and a drape value at 23° C. of 10-40°, and includes unidirectional fibers arranged along the direction of length of the prepreg tape.

18 Claims, 1 Drawing Sheet

(51) Int. Cl.
  *B32B 27/38* (2006.01)
  *B32B 5/02* (2006.01)
  *B29C 70/38* (2006.01)
  *B29K 105/08* (2006.01)
  *B29K 307/04* (2006.01)

(52) U.S. Cl.
  CPC ...... *B32B 37/14* (2013.01); *B29K 2105/0881* (2013.01); *B29K 2307/04* (2013.01); *B32B 2255/02* (2013.01); *B32B 2305/076* (2013.01); *C08J 2363/02* (2013.01); *C08J 2363/04* (2013.01); *Y10T 428/249924* (2015.04)

(56) References Cited

U.S. PATENT DOCUMENTS

| | | | |
|---|---|---|---|
| 2013/0274413 A1* | 10/2013 | Ozeki | B32B 5/12 524/611 |
| 2013/0327479 A1* | 12/2013 | Ichino | C08J 5/24 156/307.3 |
| 2015/0175760 A1 | 6/2015 | Ishimoto et al. | |
| 2015/0191592 A1* | 7/2015 | Ishimoto | C08G 59/4021 523/434 |
| 2015/0252160 A1* | 9/2015 | Teranishi | C08J 5/24 428/413 |
| 2016/0303777 A1 | 10/2016 | Miyauchi et al. | |
| 2017/0130017 A1 | 5/2017 | Okamoto et al. | |

FOREIGN PATENT DOCUMENTS

| | | | | |
|---|---|---|---|---|
| EP | 3061785 | A1 | 8/2016 | |
| EP | 3162842 | A1 | 5/2017 | |
| JP | 06-166765 | A | 6/1994 | |
| JP | 07-002975 | A | 1/1995 | |
| JP | 2007-297487 | A | 11/2007 | |
| JP | 2011-157491 | A | 8/2011 | |
| JP | 2013-060515 | A | 4/2013 | |
| JP | 2014-015563 | A | 1/2014 | |
| JP | 2014015563 | A * | 1/2014 | |
| KR | 10-2015-0041068 | A | 4/2015 | |
| WO | 2014/030636 | A1 | 2/2014 | |
| WO | 2014/030638 | A1 | 2/2014 | |
| WO | WO-2014030636 | A1 * | 2/2014 | ......... C08G 59/1477 |
| WO | 2015/060299 | A1 | 4/2015 | |

OTHER PUBLICATIONS

Office Action dated Feb. 13, 2018 issued in corresponding Japanese Patent Application No. 2017-501421.
International Search Report dated Mar. 21, 2017, issued in corresponding International Application No. PCT/2016/087616 (partial translation).
International Preliminary Report on Patentability dated Jun. 19, 2018, issued in corresponding International Application No. PCT/JP2016/087616.
"HexPly Prepreg Technology", Jan. 1, 2013, XP055529770, pp. 1-35.
Dubois et al., "Experimental Analysis of Prepreg Tack", Experimental Mechanics, Springer New York LLC, vol. 50, No. 5, Jun. 1, 2010, pp. 599-606, XP002692167.
Extended European Search Report issued in corresponding European Patent Application No. 16875797.9, dated Dec. 21, 2018.
Office Action issued in corresponding Korean Patent Application No. 10-2018-7019675, dated Jan. 16, 2020.
Office Action (and partial translation) dated Jul. 30, 2020, issued in corresponding Chinese Patent Application No. 201680073334.9.
Office Action issued in corresponding European Patent Application No. 16875797.9, dated May 26, 2020.

\* cited by examiner

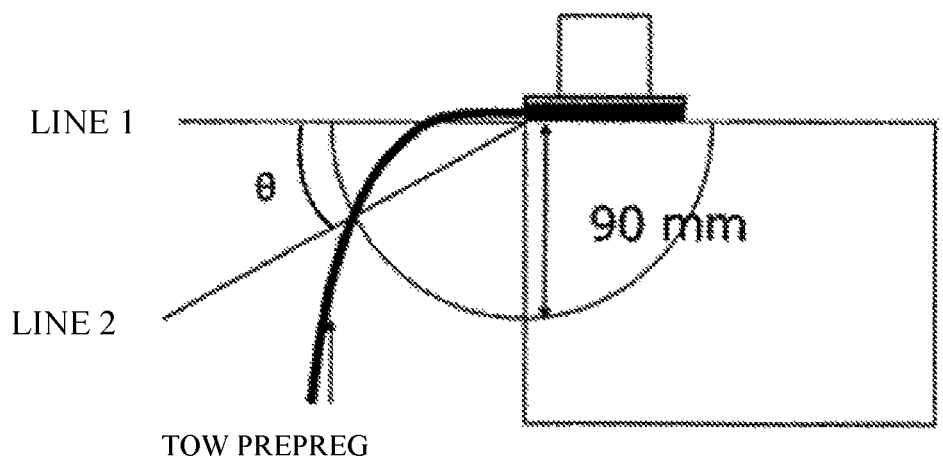

PREPREG TAPE AND USE THEREOF

TECHNICAL FIELD

The present invention relates to a prepreg tape to be used in an aircraft member, an automobile member, or the like and the use of a prepreg tape such as a method of manufacturing a fiber-reinforced composite material using this prepreg tape.

BACKGROUND ART

A prepreg for fiber-reinforced composite material composed of a reinforcing fiber and a matrix resin is widely used in the sports, aerospace, and general industrial applications since the cured product (fiber-reinforced composite material) thereof is lightweight and the prepreg exhibits excellent mechanical properties. A fiber-reinforced composite material is manufactured by heating and press-molding a prepreg laminate formed by laminating a plurality of prepregs using an autoclave or a press molding machine.

A prepreg usually has a wide sheet shape, and thus a large amount of mill ends are generated when cutting the prepreg into a desired shape. In order to cope with this, it is possible to decrease the mill ends by laminating an elongated tape-like prepreg (prepreg tape) in a shape close to the desired shape. In addition, the laminate position and the laminate angle are disturbed and troubles are caused in the molded product when the prepregs are manually laminated. In order to cope with this, it is possible to laminate the prepregs at a high speed and with high accuracy in the position and angle by laminating the prepregs using an automatic lamination apparatus. With regard to these points, it is possible to manufacture a high quality molded body at low cost by laminating the prepreg tape using an automatic lamination apparatus.

CITATION LIST

Patent Document

Patent Document 1: JP 2007-297487 A (Publication Date: Nov. 15, 2007)

SUMMARY OF THE INVENTION

Problem to be Solved by the Invention

As described above, it is possible to fabricate members exhibiting excellent mechanical properties and heat resistance at low cost by automatically laminating prepreg tapes and then press-molding the laminate in a mold. It is required to automatically laminate the prepreg tapes at a high speed in order to further cut down the cost. As the requirements in order to laminate the prepreg tapes at a high speed, the prepreg tapes are required to exhibit low adhesive property at room temperature so that the prepreg tape can be unwound from the bobbin at a high speed and twining of the prepreg tape around the guide roll or the compaction roll (laminating roll) of an automated tape placement apparatus is prevented, appropriate hardness at room temperature so that the prepreg tape can be fed to the laminating head of the automated tape placement apparatus, and adhesive property so that the prepreg tape easily sticks to the molding jig such as a mold or the prepreg tape of a lower layer (previously laminated) by being heated at the laminating head portion at about from 30° C. to 60° C.

As an example of a prepreg tape, Patent Document 1 discloses a technique to use a yarn prepreg (synonymous with tow prepreg) containing a cationically polymerizable resin composition having a viscosity of from $1.0 \times 10^4$ to $1.0 \times 10^6$ Pa·s at 30° C. and a viscosity of from 1 to 300 Pa·s at 80° C. and to cure the resin through irradiation with active energy rays or heating during or after molding. The tow prepreg disclosed in the Document exhibits low adhesive property when unwound from the bobbin but the tow prepreg itself is significantly hard and exhibits low drape property, and it is thus difficult to wind the tow prepreg onto a bobbin. In addition, adhesive property of the tow prepreg heated to about from 30° C. to 60° C. is not considered. Furthermore, according to this technique, a special apparatus is required to cure the resin.

In other words, it has not been possible to provide a tow prepreg which satisfy all of low adhesive property at room temperature, appropriate hardness at room temperature so that the tow prepreg can be fed to a laminating head, and adhesive property at a portion heated to about from 30° C. to 60° C.

Means for Solving Problem

In view of the above-mentioned problems, the inventors of the present invention have conducted intensive investigations and, as a result, found out that a prepreg tape capable of being automatically laminated at a high speed is obtained by controlling the tack values at 23° C. and 45° C. and the drape value at 23° C. within specific ranges, thereby completing the present invention.

In other words, an aspect of the present invention is as follows.

[1] A prepreg tape including a reinforcing fiber bundle impregnated with a thermosetting resin composition, in which a tack value measured at 23° C. and a plunger pushing pressure of 90 kPa is from 5 to 40 kPa, a tack value measured at 45° C. and a plunger pushing pressure of 150 kPa is from 35 to 100 kPa, a drape value at 23° C. is from 10° to 40°, and the prepreg tape includes unidirectional fibers arranged along a length direction of the prepreg tape.

Effect of the Invention

According to an aspect of the present invention, it is possible to provide a prepreg tape which exhibits excellent unwinding property due to low adhesive property at room temperature, the property of preventing twining of the prepreg tape around the guide roll and the compaction roll, excellent shape retaining property at the laminating head portion due to an appropriate hardness at room temperature, and appropriate sticking property of the heated portion by the laminating head at about from 30° C. to 60° C. due to an increase in adhesive property at a high temperature and is suitable for an automatic lamination process using an automated tape placement apparatus. It is also possible to provide a fiber-reinforced composite material using the prepreg tape according to the present invention.

Incidentally, in the present invention, the term "room temperature" means the temperature in a normal working environment when conducting the fabrication and molding operation of the prepreg tape, and it is about 23° C.

BRIEF DESCRIPTION OF DRAWINGS

FIG. 1 is a schematic diagram which illustrates a method of measuring a drape value in the present invention.

MODE(S) FOR CARRYING OUT THE INVENTION

The invention according to an aspect of the present invention relates to a prepreg tape in which a reinforcing fiber bundle is impregnated with a thermosetting resin composition, and the prepreg tape has a tack value of from 5 to 40 kPa measured at 23° C. and a plunger pushing pressure of 90 kPa, a tack value of from 35 to 100 kPa measured at 45° C. and a plunger pushing pressure of 150 kPa, and a drape value of from 10° to 40° at 23° C. and includes unidirectional fibers arranged along a length direction of the prepreg tape.

Hereinafter, the present invention will be described in detail.

<Prepreg Tape>

The prepreg tape to be described in the present specification may be a tow prepreg which is a tape-like intermediate material obtained by impregnating a continuous reinforcing fiber bundle with a matrix resin composition or a slit tape obtained by slitting a sheet-like prepreg in which unidirectionally aligned reinforcing fiber bundles are impregnated with a thermosetting resin composition.

The prepreg tape according to an aspect of the present invention exhibits excellent unwinding property due to low adhesive property at room temperature, the property of preventing twining of the prepreg tape around the guide roll and the compaction roll, excellent shape retaining property at the laminating head portion due to an appropriate hardness at room temperature, and appropriate sticking property of the heated portion by the laminating head at about from 30° C. to 60° C. due to an increase in adhesive property at a high temperature. For this reason, the prepreg tape according to an aspect of the present invention can be a prepreg tape suitable for an automatic lamination process using an automated tape placement apparatus.

<Tow Prepreg>

Hereinafter, a case in which the prepreg tape is a tow prepreg in an aspect of the present invention will be described.

The term "tow prepreg" is a narrow intermediate base material obtained by, for example, impregnating a reinforcing fiber bundle in which filaments of several thousands to several tens of thousands of reinforcing fibers are arranged in one direction with a matrix resin composition and then winding this onto a bobbin such as a paper tube.

As the reinforcing fiber bundle in an aspect of the present invention, it is possible to use a reinforcing fiber to be used in an ordinary fiber-reinforced composite material such as a glass fiber, a carbon fiber (incidentally, a graphite fiber is also treated to be included in the carbon fiber in the present invention), an aramid fiber, and a boron fiber. Among these, a carbon fiber is preferable since it is lightweight, has a high strength and a high modulus of elasticity, and also exhibits excellent heat resistance and chemical resistance. Examples of the carbon fiber may include carbon fibers such as a pitch-based carbon fiber, polyacrylonitrile (PAN)-based carbon fiber, and a rayon-based carbon fiber, and any carbon fiber may be used, but a PAN-based carbon fiber is more preferable from the viewpoint of productivity of carbon fiber.

As the carbon fiber, a highly strong carbon fiber having a strand tensile strength of 4 GPa or more and preferably 4.6 GPa or more and a tensile elongation of 1.5% or more is suitable for the strength development of the fiber-reinforced composite material. Here, the strand tensile strength refers to the strength measured through a strand tensile test to be conducted in conformity to JIS R7601 (1986).

The number of filaments in the reinforcing fiber bundle to be used in an aspect of the present invention is preferably from 1,000 to 60,000 and more preferably from 3,000 to 50,000. It is possible to increase the productivity when automatically laminating the reinforcing fiber bundle as a tow prepreg by setting the number of filaments to 1000 or more. It is possible to facilitate impregnation of the reinforcing fiber bundle with the thermosetting resin composition by setting the number of filaments to 60,000 or fewer.

The diameter of the filaments constituting reinforcing fiber bundle is preferably such that the filament diameter is in a range of from 1 to 20 µm and more preferably in a range of from 3 to 10 µm. It is possible to increase the tensile strength and the tensile modulus by setting the diameter of the filament to 20 µm or less. In addition, it is possible to increase the productivity of the reinforcing fiber bundle and to cut down the manufacturing cost by setting the diameter of the filament to 1 µm or more.

<Tack Value at 23° C.>

The tack value of the tow prepreg can be measured by a probe tack testing method using an adhesive force measuring machine. The probe tack testing method is a method of measuring a force required to peel off a probe (plunger) having a constant contact area from the tow prepreg at a constant speed after pushing the plunger against the tow prepreg for a certain time at a constant pressure.

The tack value of tow prepreg can be expressed as an average maximum stress value. Incidentally, the stress value means a tensile stress to be generated at the contact surface between the plunger and the sample, and the average maximum stress value is a value obtained through a probe tack test to be conducted under the following conditions.

(Probe Tack Testing Conditions)
Contact area of plunger with sample: 3.1 cm$^2$
Plunger pushing time: 10 seconds
Plunger pushing pressure: 90 kPa
Plunger lifting speed: 1 mm/sec
Temperature of sample stage: 23° C.
Procedure:

1) The tow prepregs are arranged on the sample stage so as to have an area equal to or larger than the contact area with the plunger and fixed so as not to peel off during the measurement.

2) The plunger is pushed against the tow prepreg for 10 seconds by applying a downward pressure of 90 kPa.

3) The plunger is lifted at the speed of 1 mm/sec.

4) The maximum value of the stress value while lifting the plunger is taken as the maximum stress value, the measurement is conducted three times in total, and the average value of the maximum stress values thus obtained is taken as the average maximum stress value.

The tack value of the tow prepreg according to an aspect of the present invention is from 5 to 40 kPa and preferably from 20 to 40 kPa at 23° C. in the case of being measured at a plunger pushing pressure of 90 kPa. It is easy to wind the tow prepreg onto a bobbin by setting the tack value to 5 kPa or more. In addition, it is possible to unwind the tow prepreg from the bobbin at a high speed and to prevent twining of the tow prepreg around the guide roll and the like by setting the tack value to 40 kPa or less.

<Tack Value at 45° C.>

The tack value at 45° C. is measured by the same measurement method as in the tack value at 23° C. except that the temperature of sample stage is set to 45° C. and the plunger pushing pressure is set to 150 kPa.

The tack value of the tow prepreg according to an aspect of the present invention is from 35 to 100 kPa and preferably from 40 to 80 kPa at 45° C. in the case of being measured at a plunger pushing pressure of 150 kPa. It is possible to enhance the adhesive property at the portion where the lamination is ongoing by setting the tack value to 35 kPa or more. It is possible to prevent twining of the tow prepreg around the compaction roll of the portion where the lamination is ongoing by setting the tack value to 100 kPa or less.

Here, the term "the portion where the lamination is ongoing" means a portion to be pushed against a molding jig or another tow prepreg by a laminating head of the automated tape placement apparatus in the tow prepreg.

<Drape Value at 23° C.>

The drape value at 23° C. is a value obtained by the following method.

First, a tow prepreg cut into a length of 250 mm is placed on the upper surface of a horizontal test stand, and a portion 200 mm distant from the tip of the tow prepreg is projected in the air. An aluminum plate is placed on the remaining 50 mm portion and a weight of about 100 g is placed thereon and fixed so as not to move during the measurement. The angle formed by the test stand and the hung tow prepreg in 30 seconds after the tow prepreg is held so as to be horizontal, then released from the holding, and hung down is taken as the drape value θ(°). The angle formed by the test stand and the hung tow prepreg refers to the angle formed by a line 1 and a line 2 where the line 1 denotes the horizontal line on the upper surface of the test stand and the line 2 denotes the line connecting the tip point of the test stand and the "point at which a circle which has a radius of 90 mm and takes the tip of the test stand as the center intersects the tow prepreg". The temperature at the time of measurement is 23° C.

The drape value of the tow prepreg according to an aspect of the present invention is from 10° to 40° and preferably from 20° to 35° at 23° C. It is possible to smoothly wind the tow prepreg onto a bobbin by setting the drape value to 10° or more. It is possible to smoothly supply the tow prepreg to the laminating head portion by setting the drape value to 40° or less.

<Viscosity of Thermosetting Resin Composition>

The thermosetting resin composition to be used in an aspect of the present invention preferably has a viscosity of from $1.0 \times 10^4$ to $1.0 \times 10^5$ Pa·s at 30° C. it is possible to obtain a tow prepreg having an appropriate hardness by setting the viscosity at 30° C. to $1.0 \times 10^4$ Pa·s or more, and it is possible to smoothly wind the tow prepreg onto a bobbin by setting the viscosity at 30° C. to $1.0 \times 10^5$ Pa·s or less. The viscosity is more preferably $1.0 \times 10^4$ to $8.0 \times 10^4$ Pa·s and still more preferably $1.0 \times 10^4$ to $5.0 \times 10^4$ Pa·s at 30° C.

In addition, the viscosity at 45° C. is preferably $1.0 \times 10^2$ to $1.0 \times 10^3$ Pa·s. It is possible to prevent fluctuation of the tow width when automatically laminating the tow prepreg by setting the viscosity at 45° C. to $1.0 \times 10^2$ Pa·s or more. It is possible to impart appropriate drape property and tackiness when automatically laminating the tow prepreg by setting the viscosity at 45° C. to $1.0 \times 10^3$ Pa·s or less. The viscosity is more preferably $1.0 \times 10^2$ to $8.0 \times 10^2$ Pa·s and still more preferably $1.0 \times 10^2$ to $6.0 \times 10^2$ Pa·s at 45° C.

In addition, in the measurement of temperature-programmed viscosity in which the temperature of thermosetting resin composition to be used in an aspect of the present invention is raised at 2.0° C./min, the minimum viscosity is preferably from 0.3 to 20 Pa·s and more preferably from 0.5 to 20 Pa·s. By setting the minimum viscosity to 0.3 Pa·s or more, it is possible to suppress the resin flow amount at the time of press molding using the tow prepreg and to prevent poor appearance that unevenness is caused on the surface of the fiber-reinforced composite material to be obtained. By setting the minimum viscosity to 0.5 Pa·s or more, it is possible to further suppress the resin flow amount at the time of press molding using the tow prepreg and to further prevent poor appearance that unevenness is caused on the surface of the fiber-reinforced composite material to be obtained. By setting the minimum viscosity to less than 20 Pa·s, it is possible to increase the resin flow amount and to prevent the occurrence of defects that the resin composition is not filled in every corner of the mold at the time of press molding using the tow prepreg.

The temperature range having the minimum viscosity is preferably from 100° C. to 120° C. It is possible to prevent that the flow amount at the time of press molding is too low and the resin does not spread all over the molded body when the temperature range having the minimum viscosity is 100° C. or higher. In addition, it is possible to suppress the flow amount at the time of press molding when the temperature range having the minimum viscosity is 120° C. or lower.

<Curability of Thermosetting Resin Composition>

The thermosetting resin composition to be used in an aspect of the present invention preferably has a curing completion time of from 2.0 to 15.0 minutes, more preferably from 2.0 to 10.0 minutes, and still more preferably from 2.0 to 8.0 minutes at 140° C. when the curing completion time is measured using a curelastometer.

<Evaluation and Evaluating Method>

For measurement using a curelastometer, a test is conducted in conformity to the industry standard JIS K6300 for the rubber vulcanization test. At this time, the frequency of vibrations is set to 100 cpm, the angle of amplitude of vibrations is set to ±¼°, and the dice shape is set to WP-100.

The torque-time curve by a curelastometer is a curve obtained by taking the torque measured as the vertical axis and the time as the horizontal axis. Usually, the torque increases as the curing reaction of resin proceeds and the torque reaches saturation as the curing reaction approaches the end.

The curing completion time in the present invention is defined as the time required until the inclination of the tangential line to the torque-time curve becomes 1/20 of the maximum value after the inclination becomes the maximum value.

When the curing completion time is within 15.0 minutes at 140° C. when measured using a curelastometer, the thermosetting resin composition to be used in an aspect of the present invention exhibits excellent curability, and it is thus possible to shorten the occupy time of the press mold in the press molding and to shorten the molding cycle time. In addition, when the curing completion time is 2.0 minutes or longer at 140° C. when measured using a curelastometer, there is time for the resin to flow and thus the resin can sufficiently spread all over the molded body.

<Resin Content>

The resin content in the tow prepreg is preferably from 20% to 45% by mass and more preferably from 25% to 40% by mass. It is possible to decrease the voids in the fiber-reinforced composite material to be obtained by setting the resin content to 20% by mass or more, and it is possible to prevent tackiness of the tow prepreg from being too strong as well as to enhance the mechanical properties of the fiber-reinforced composite material to be obtained by setting the resin content to 45% by mass or less.

<Width of Tow Prepreg>

The average width of the tow prepreg in an aspect of the present invention is preferably from 2 to 30 mm, more preferably from 4 to 28 mm although it depends on the number of filaments in the reinforcing fiber bundle as well. In addition, the thickness of the tow prepreg is preferably from 0.10 to 0.70 mm and more preferably from 0.15 to 0.50 mm.

<Thermosetting Resin Composition>

The thermosetting resin composition to be used in an aspect of the present invention may be properly selected from known materials and used in combination so that the tack values of the tow prepreg to be fabricated using this at 23° C. and 45°, and the drape value at 23° C. respectively satisfy the ranges described above.

The thermosetting resin can use a usual resin to be used as a matrix resin of a fiber-reinforced composite material, for example, an unsaturated polyester resin, a vinyl ester resin, a phenol resin, an epoxy resin, a polyimide resin, and a bismaleimide resin as a main component, but an epoxy resin is preferable since a fiber-reinforced composite material exhibiting particularly excellent mechanical properties is obtained and favorable moldability is exhibited.

Hereinafter, a thermosetting resin composition containing an epoxy resin (hereinafter simply referred to as an "epoxy resin composition") as a thermosetting resin will be described.

The epoxy resin composition contains at least (A) an epoxy resin and (B) a curing agent.

Examples of (A) the epoxy resin may include a glycidyl ether type epoxy resin, a glycidyl amine type epoxy resin, a glycidyl ester type epoxy resin, and an alicyclic epoxy type epoxy resin, but it is preferable to contain a glycidyl ether type epoxy resin or a glycidyl amine type epoxy resin from the viewpoint of requiring low cost, being easily available, and exhibiting excellent reactivity.

These epoxy resins may be used singly or two or more kinds thereof may be used in combination.

In the case of using two or more kinds of epoxy resins concurrently, it is preferable to use an epoxy resin which is liquid at room temperature and an epoxy resin which is solid at room temperature in combination in order to obtain a tow prepreg which exhibits all of low adhesive property at room temperature, an appropriate hardness so that the tow prepreg can be fed to the laminating head, and sufficient adhesive property in the case of being heated to about from 30° C. to 60° C.

The content of the epoxy resin which is liquid at room temperature is preferably from 10 to 70 parts by mass, more preferably from 10 to 60 parts by mass, more preferably from 10 to 50 parts by mass, and still more preferably from 15 to 50 parts by mass in 100 parts by mass of (A) the epoxy resin. It is possible to impart appropriate drape property to the tow prepreg by setting the content to 10 parts by mass or more, it is possible to impart an appropriate hardness to the tow prepreg at room temperature by setting the content to 70 parts by mass or less, and it is possible to impart a more appropriate hardness to the tow prepreg at room temperature by setting the content to 60 parts by mass or less.

Examples of commercially available products of the epoxy resin which is liquid at room temperature may include bisphenol A type epoxy resins such as jER 825, 826, 827, 828, and 834 (manufactured by Mitsubishi Chemical Corporation), EPICLON 850 (manufactured by DIC Corporation), Epotohto YD-128 (manufactured by NIPPON STEEL & SUMIKIN CHEMICAL CO., LTD.), DER-331 and DER-332 (manufactured by Dow Chemical Company), and ARALDITE LY 556 (manufactured by Huntsman Advanced Materials);

bisphenol F type epoxy resins such as such as jER 806, 807, and 1750 (manufactured by Mitsubishi Chemical Corporation), EPICLON 830 (manufactured by DIC Corporation), and Epotohto YD-170 and Epotohto YD-175 (manufactured by NIPPON STEEL & SUMIKIN CHEMICAL CO., LTD.);

phenol novolak type epoxy resins such as jER 152 (manufactured by Mitsubishi Chemical Corporation), EPICLON N-730A (manufactured by DIC Corporation), and DEN-425 (manufactured by Dow Chemical Company);

amine type epoxy resins such as jER 604 and 630 (manufactured by Mitsubishi Chemical Corporation) and MY0600 and MY0500 (manufactured by Huntsman Advanced Materials); and alicyclic epoxy resins such as CELLOXIDE 2021P and CELLOXIDE 8000 (manufactured by Daicel Corporation). These epoxy resins which are liquid at room temperature may be used singly or two or more kinds thereof may be used concurrently.

As the epoxy resin which is liquid at room temperature, a bisphenol A type epoxy resin and a phenol novolak type epoxy resin are preferable from the viewpoint of excellent balance between the toughness and heat resistance of the cured product.

In the case of containing a phenol novolak type epoxy resin as the epoxy resin which is liquid at room temperature, the content of the phenol novolak type epoxy resin is preferably from 10 to 60 parts by mass and more preferably from 20 to 60 parts by mass in 100 parts by mass of (A) the epoxy resin. It is possible to improve the curability of the epoxy resin composition and to improve the heat resistance of the cured product by setting the content to 10 parts by mass or more. In addition, it is possible to prevent the cured product from being brittle by setting the content to 60 parts by mass or less.

An epoxy resin which is solid at room temperature refers to an epoxy resin which is solid at room temperature and an epoxy resin which is semisolid at room temperature. An epoxy resin which is semisolid at room temperature refers to an epoxy resin which is solid at 20° C. and liquid at 40° C.

The epoxy resin which is solid at room temperature may be used singly or two or more kinds thereof may be used concurrently.

The content of the epoxy resin which is solid at room temperature is preferably from 30 to 90 parts by mass, more preferably from 40 to 90 parts by mass, more preferably from 50 to 90 parts by mass, and still more preferably from 50 to 85 parts by mass in 100 parts by mass of (A) the epoxy resin. It is possible to impart an appropriate hardness and appropriate tackiness to the tow prepreg at room temperature by setting the content to 30 parts by mass or more, it is possible to impart a more appropriate hardness and more appropriate tackiness to the tow prepreg at room temperature by setting the content to 40 parts by mass or more, and it is possible to impart appropriate drape property to the tow prepreg by setting the content to 90 parts by mass or less.

Examples of commercially available products of the epoxy resin which is solid at room temperature may include phenol novolak type epoxy resins such as jER 154 and 157S70 (manufactured by Mitsubishi Chemical Corporation) and EPICLON N-770, EPICLON N-740, and EPICLON N-775 (manufactured by DIC Corporation); cresol novolak type epoxy resins such as EPICLON N-660, EPI- CLON N-665, EPICLON N-670, EPICLON N-673, and EPICLON N-695 (manufactured by DIC Corporation) and EOCN-1020, EOCN-102S, and EOCN-104S (manufactured by Nippon Kayaku Co., Ltd.);
bisphenol A type epoxy resins such as jER 1001, 1002, and 1003 (manufactured by Mitsubishi Chemical Corporation);
bisphenol F type epoxy resins such as jER 4004P and 4005P (manufactured by Mitsubishi Chemical Corporation);
biphenyl type epoxy resins such as YX4000 and YL6121H (manufactured by Mitsubishi Chemical Corporation);
naphthalene type epoxy resin such as HP4700 (manufactured by DIC Corporation); dicyclopentadiene type epoxy resin such as HP7200 (manufactured by DIC Corporation);
epoxy resins having an oxazolidone ring skeleton such as TSR-400 (manufactured by DIC Corporation), DER 858 (manufactured by Dow Chemical Company), and AER 4152 (manufactured by Asahi Kasei Corporation); and
bisphenol S type epoxy resins such as EXA-1514 and EXA-1517 (manufactured by DIC Corporation).

In the case of containing an oxazolidone ring-containing epoxy resin as the epoxy resin which is solid at room temperature, the content of the oxazolidone ring-containing epoxy resin is preferably from 10 to 90 parts by mass and more preferably from 20 to 70 parts by mass in 100 parts by mass of (A) the epoxy resin. It is possible to improve the balance between the heat resistance and toughness of the cured product by setting the content to 10 parts by mass or more, and it is possible to prevent deterioration in heat resistance of the cured product by setting the content to 90 parts by mass or less.

In addition, as the epoxy resin which is solid at room temperature, an epoxy resin having a structure represented by the following formulas (1) and (2) may be used. Examples of such an epoxy resin may include a preliminary reaction product of a bisphenol A type epoxy resin with 4,4'-diaminodiphenyl sulfone.

[Chem. 1]

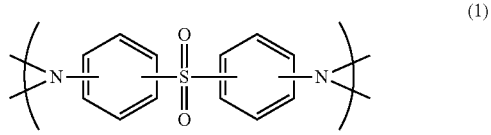

(1)

[Chem. 2]

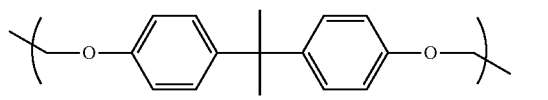

(2)

The reaction of a bisphenol A type epoxy resin with 4,4'-diaminodiphenyl sulfone may be conducted, for example, in conformity to the description in WO 2013/081060 A.

In the case of containing a preliminary reaction product of a bisphenol A type epoxy resin with 4,4'-diaminodiphenyl sulfone as the epoxy resin which is solid at room temperature, the preliminary reaction product is preferably from 10 to 90 parts by mass and more preferably from 20 to 70 parts by mass in 100 parts by mass of (A) the epoxy resin. It is possible to improve curability of the epoxy resin composition by setting the content to 10 parts by mass or more, and it is possible to prevent the cured product from being brittle by setting the content to 90 parts by mass or less.

As the epoxy resin which is solid at room temperature, a preliminary reaction product of a urethane and isocyanate-modified epoxy resin or a bisphenol A type epoxy resin with 4,4'-diaminodiphenyl sulfone is preferable from the viewpoint of excellent balance between the heat resistance and toughness of the cured product and a preliminary reaction product of a bisphenol A type epoxy resin with 4,4'-diaminodiphenyl sulfone is more preferable from the viewpoint that the curing reaction promptly proceeds.

Examples of (B) the curing agent may include an amine type curing agent, an amine adduct type curing agent, an acid anhydride type (carboxylic anhydride or the like) curing agent, a phenol type (phenol novolak resin or the like) curing agent, a mercaptan type curing agent, a Lewis acid amine complex type curing agent, and an onium salt type curing agent. A curing agent having any structure may be used as long as it can cure the epoxy resin. Among these, amine type and amine adduct type curing agents are preferable from the viewpoint of excellent physical properties of the cured product. These curing agents may be used singly or two or more kinds thereof may be used concurrently.

As the amine type curing agent, there are, for example, aromatic amines such as diaminodiphenylmethane and diaminodiphenyl sulfone, aliphatic amines, dicyandiamide, tetramethylguanidine, thiourea adduct amines, and isomers and modified products thereof. Among these, dicyandiamide is preferable from the viewpoint of excellent storage stability of the tow prepreg. Examples of commercially available products of dicyandiamide may include jER Cure DICY7 (manufactured by Mitsubishi Chemical Corporation).

Examples of commercially available products of the amine adduct type curing agent may include AJICURE PN-23 and PN-50 (manufactured by Ajinomoto Fine-Techno Co., Inc.).

The content of (B) the curing agent is preferably from 3 to 10 parts by mass, more preferably from 3 to 8 parts by mass, and still more preferably from 4 to 8 parts by mass with respect to 100 parts by mass of (A) the epoxy resin. It is possible to sufficiently cure the epoxy resin contained in the epoxy resin composition when the content of (B) the curing agent is 3 parts by mass or more. Meanwhile, it is possible to obtain a cured product of resin exhibiting high toughness when the content is 10 parts by mass or less.

A curing accelerator may be used in order to enhance the curing activity by (B) the curing agent.

For example, in a case in which the curing agent is dicyandiamide, a urea derivative or an imidazole derivative is preferable as a curing accelerator. In addition, two or more kinds of these curing auxiliaries may be used in combination.

Examples of a compound to be used as the urea derivative may preferably include urea derivatives such as 3-phenyl-1,1-dimethylurea, 3-(3,4-dichlorophenyl)-1,1-dimethylurea (DCMU), 3-(3-chloro-4-methylphenyl)-1,1-dimethylurea, and toluene bis(dimethyl urea) (TBDMU). Among these, toluene bis(dimethyl urea) (TBDMU) is particularly preferable from the viewpoint of improving the curing speed. Examples of commercially available products of TBDMU may include Omicure 24 (manufactured by PTI Japan Corporation).

An imidazole derivative has a nitrogen atom having an unshared electron pair in the structure, and this activates the epoxy group of the component (A) and dicyandiamide and promotes curing reaction. The imidazole derivative is not particularly limited, but it refers to a compound obtained by substituting 1-position, 2-position, 4-position, and 5-position of 1H-imidazole with an arbitrary substituent. The imidazole derivative may be unsubstituted, substituted with one substituent, or substituted with a plurality of substituents. Examples of the imidazole derivative may include 2,4-diamino-6-[2'-methylimidazolyl-(1')]-ethyl-s-triazine (for example, 2MZA-PW (manufactured by SHIKOKU CHEMICALS CORPORATION) as a commercially available product) and 2-phenyl-4,5-dihydroxymethylimidazole (for example, 2PHZ-PW (manufactured by SHIKOKU CHEMICALS CORPORATION) as a commercially available product).

The content of the curing accelerator is preferably from 0.5 to 10 parts by mass and more preferably from 1 to 8 parts by mass with respect to 100 parts by mass of (A) the epoxy resin. It is preferable that the content of the curing accelerator is 0.5 part by mass or more since it is possible to sufficiently exhibit an effect of increasing the curing speed, and it is preferable that the content is 10 parts by mass or less since it is possible to obtain a cured product of resin exhibiting high toughness.

As other components, the epoxy resin composition can contain a thermoplastic resin in order to improve the toughness of the fiber-reinforced composite material to be obtained using this. Examples of the thermoplastic resin may include polyvinyl formal (PVF), polymethyl methacrylate (PMMA), polyether sulfone (PES), and polyether imide (PEI). Among these, PVF or PES is preferable since it improves the toughness of the fiber-reinforced composite material and exhibits excellent heat resistance.

The content of these thermoplastic resins is preferably from 0.2 to 45 parts by mass and more preferably from 0.5 to 25 parts by mass with respect to 100 parts by mass of (A) the epoxy resin. It is preferable that the content of the thermoplastic resin is 0.2 part by mass or more since it is possible to sufficiently exhibit an effect of improving the toughness of the fiber-reinforced composite material, and it is preferable that the content is 45 parts by mass or less since it is possible to obtain a tow prepreg exhibiting appropriate tackiness and an epoxy resin composition exhibiting appropriate temperature dependency of viscosity. In addition, it is possible to contain thermoplastic resin particles such as polyamide (PA) particles and an acrylic polymer, an inorganic filler such as powdery silica, a liquid rubber such as a carboxyl-terminated butadiene acrylonitrile copolymer rubber, a solid rubber such as a nitrile rubber, rubber particles, core-shell type elastomer particles, a phosphorus compound, a defoaming agent, a flame retardant, and the like depending on the application of the fiber-reinforced composite material to be fabricated.

Incidentally, the thermosetting resin composition according to an aspect of the present invention may contain a vinyl ester resin or an unsaturated polyester resin as a thermosetting resin as described above, and in these cases as well, it is possible to suitably obtain a tow prepreg having the tack value and drape value according to an aspect of the present invention by concurrently using a vinyl ester resin which is liquid at room temperature and a vinyl ester resin which is solid at room temperature or an unsaturated polyester which is liquid at room temperature and an unsaturated polyester which solid at room temperature and thus preparing a thermosetting resin composition having the viscosity described above.

The thermosetting resin composition according to an aspect of the present invention can be manufactured by a general method to be conventionally used as long as the respective components are kneaded and uniformly dispersed or dissolved.

For example, the thermosetting resin composition may be prepared by mixing the respective components constituting the resin composition at the same time or using a master batch prepared in advance by properly dispersing a curing agent and other additives in a thermosetting resin such as an epoxy resin if necessary. For the mixing operation, it is possible to use a mixer such as a triple roll mill, a planetary mixer, a kneader, a universal stirrer, a homogenizer, or a homo-dispenser.

<Method of Manufacturing Tow Prepreg>

The tow prepreg according to an aspect of the present invention can be fabricated by impregnating a reinforcing fiber bundle with a thermosetting resin composition.

Examples of a method of supplying the thermosetting resin composition to the reinforcing fiber bundle may include a "resin bath method" in which the reinforcing fiber bundle (tow) passes through the interior of the resin bath to be impregnated with the thermosetting resin composition and then the resin content is adjusted by squeezing the excess matrix resin composition using an orifice, a roll, and the like; a "rotating roll method" of a transfer roll impregnation method (for example, impregnation method using a rotating drum having a doctor blade) in which a thermosetting resin composition layer is formed on a rotating roll and transferred to a tow; a "paper transfer method" in which a thermosetting resin layer is formed on paper and transferred to a tow; and a "nozzle dropping method" described in JP 09-176346 A, JP 2005-335296 A, JP 2006-063173 A, and the like. Among these, the rotating roll method is preferable from the viewpoint of control of the supply amount of the thermosetting resin composition and ease of implementation.

It is preferable that the reinforcing fiber bundle is uniformly impregnated with the thermosetting resin composition. By being uniformly impregnated, it is possible to decrease voids in the fiber-reinforced composite material fabricated and thus to improve the mechanical properties thereof as well as to prevent that the tackiness partially increases and the unwinding is difficult as the thermosetting resin composition is unevenly distributed on the surface.

<Backing Film>

In addition, it is preferable that a plastic backing film is stuck to at least one side of the tow prepreg according to an aspect of the present invention in order to prevent the tow prepregs from sticking to each other after being wound. The width of the backing film is the average width of the tow prepreg + from 4 to 10 mm and preferably + from 3 to 8 mm, and the thickness thereof is preferably from 0.02 to 0.07 mm. The material for the backing film is not particularly limited as long as it exhibits appropriate adhesive property to the tow prepreg and release property, but a stretchable plastic film such as polyethylene or polypropylene is suitable.

<Automatic Lamination Apparatus>

It is possible to use a known apparatus as an apparatus (automated tape placement apparatus) for automatically laminating a tow prepreg. As the automatic lamination apparatus, it is preferable to have a configuration in which a tow prepreg drawn out from a supply device is wound onto a laminating roll and laminated by rolling the laminating roll along a mold while pressing the laminating roll against the mold as disclosed in JP 4-62142 A. Furthermore, it is preferable to have a function capable of heating the portion where the lamination is ongoing in order to prevent peeling off of the tow prepreg after being laminated. The tow prepreg according to an aspect of the present invention can be suitably used for an automatic lamination apparatus. In other words, an automatic lamination molding method in which the tow prepreg is laminated after imparting adhesive property to the prepreg tape through heating is also an aspect of the present invention. In the present specification, the term "automatic lamination molding method" refers to a molding method using an automatic lamination apparatus. In addition, a prepreg sheet (laminate) in which a tow prepreg is laminated is also an aspect of the present invention. The prepreg sheet according to an aspect of the present invention can be suitably manufactured by carrying out, for example, the automatic lamination molding method using an automatic lamination apparatus.

<Manufacture of Fiber-Reinforced Composite Material>

The fiber-reinforced composite material according to an aspect of the present invention is obtained by press-molding the laminate of the tow prepreg according to an aspect of the present invention described above in a mold.

The mold to be used for press molding is not particularly limited, and any mold may be used as long as the tow prepreg according to an aspect of the present invention can be cured at a high temperature and a high pressure, and it is preferable to use a mold having a structure capable of keeping the interior of the mold airtight when the mold is closed. Here, airtightness means that the epoxy resin composition constituting a molding material does not substantially leak out from a mold even when the molding material is placed in the mold in an amount sufficient to fill the mold and pressed.

Examples of the mold which keeps the interior airtight may include a mold which adopts a shear edge structure or a rubber seal structure at the portion at which the upper mold and the lower mold (male mold and female mold) come into contact with each other when the mold is tightened. In addition, the mold may be a mold which adopts any known structure as long as the interior of the mold is kept airtight.

<Slit Tape>

Hereinafter, a case in which the prepreg tape is a slit tape will be described in detail.

The slit tape is a narrow intermediate base material obtained by slitting a usual unidirectional prepreg in a strip shape using a slitter and then winding this onto a bobbin such as a paper tube.

Incidentally, the difference between the tow prepreg described above and the slit tape is that the former is manufactured by impregnating a reinforcing fiber bundle unit with a resin and winding the impregnated reinforcing fiber bundle unit in a constant width but the latter is manufactured by fabricating a sheet-like unidirectional prepreg in which unidirectionally aligned reinforcing fiber bundles are impregnated with a thermosetting resin composition and slitting the obtained prepreg into a predetermined width along the arranged direction of the reinforcing fiber bundle. Hence, only matters related to such difference will be described below. The description on the matters other than the matters to be described below will not be repeated since the description on the above-described tow prepreg can also be applied to the slit tape.

<Method of Manufacturing Slit Tape>

The slit tape can be fabricated by slitting a sheet-like unidirectional prepreg in which unidirectionally aligned reinforcing fiber bundles are impregnated with a thermosetting resin composition into a strip shape using a dedicated slitter. Examples of a method of manufacturing the unidirectional prepreg may include a hot-melt method in which a thermosetting resin composition is formed into a film and this film is stuck to a carbon fiber bundle aligned in one direction and then impregnated thereinto by applying heat.

SUMMARY

[1] A prepreg tape in which a reinforcing fiber bundle is impregnated with a thermosetting resin composition and which has a tack value of from 5 to 40 kPa measured at 23° C. and a plunger pushing pressure of 90 kPa, a tack value of from 35 to 100 kPa measured at 45° C. and a plunger pushing pressure of 150 kPa, and a drape value of from 10° to 40° at 23° C. and includes unidirectional fibers arranged along a length direction of the prepreg tape.

[2] The prepreg tape according to [1], in which the thermosetting resin composition has a curing completion time of from 2.0 to 15.0 minutes at 140° C. when the curing completion time is measured using a curelastometer.

[3] The prepreg tape according to [1] or [2], in which the thermosetting resin composition has a viscosity of from $1.0 \times 10^4$ to $1.0 \times 10^5$ Pa·s at 30° C. and a viscosity of from $1.0 \times 10^2$ to $1.0 \times 10^3$ Pa·s at 45° C.

[4] The prepreg tape according to any one of [1] to [3], in which the thermosetting resin composition has a minimum viscosity of from 0.3 to 20 Pa·s when the viscosity is measured at a rate of temperature rise of 2.0° C./min and a temperature range having the minimum viscosity of from 100° C. to 120° C.

[5] The prepreg tape according to any one of [1] to [4], in which a content rate of the thermosetting resin composition with respect to a mass of the prepreg tape is from 20% to 45% by mass.

[6] The prepreg tape according to any one of [1] to [5], in which an average width of the prepreg tape is from 2 to 30 mm.

[7] The prepreg tape according to any one of [1] to [6], in which the number of filaments in the reinforcing fiber bundle is from 1,000 to 60,000.

[8] The prepreg tape according to any one of [1] to [7], in which the thermosetting resin composition contains (A) an epoxy resin and (B) a curing agent.

[9] The prepreg tape according to [8], in which the thermosetting resin composition further contains (C) a curing accelerator.

[10] The prepreg tape according to [8] or [9], in which (A) the epoxy resin contains an epoxy resin which is solid at room temperature and an epoxy resin which is liquid at room temperature.

[11] The prepreg tape according to any one of [8] to [10], in which the epoxy resin which is solid at room temperature contains a preliminary reaction product of a bisphenol A type epoxy resin with 4,4'-diaminodiphenyl sulfone.

[12] The prepreg tape according to any one of [8] to [11], in which the epoxy resin which is liquid at room temperature contains a phenol novolak type epoxy resin or a bisphenol A type epoxy resin.

[13] The prepreg tape according to any one of [8] to [12], in which a content of (B) the curing agent is from 3 to 10 parts by mass and a content of (C) the curing accelerator is from 0.5 to 10 parts by mass with respect to 100 parts by mass of (A) the epoxy resin in the thermosetting resin composition.

[14] The prepreg tape according to any one of [8] to [13], in which (B) the curing agent is at least one kind of compound selected from the group consisting of an amine type curing agent and an amine adduct type curing agent and (C) the curing accelerator is at least one kind of compound selected from the group consisting of a urea derivative and an imidazole derivative.

[15] A fiber-reinforced composite material obtained by curing the prepreg tape according to any one of [1] to [14].

[16] An automatic lamination molding method, the method including laminating the prepreg tape according to any one of [1] to [14] after imparting adhesive property to the prepreg tape through heating.

[17] A laminate obtained by laminating the prepreg tape according to any one of [1] to [14].

[18] A method of manufacturing a fiber-reinforced composite material, the method including heating and pressing one obtained by laminating the prepreg tape according to any one of [1] to [14] in a mold.

The present invention is not limited to each of the above-described embodiments, various modifications are possible within the scope indicated in the claims, and embodiments obtained by appropriately combining technical means disclosed in different embodiments are also included in the technical scope of the present invention. New technical features can be formed by combining technical means disclosed in each of the embodiments.

EXAMPLES

Hereinafter, the present invention will be specifically described with reference to Examples, but the present invention is not limited to these Examples. Unless otherwise stated, all blending ratios of materials (raw materials) are expressed in parts by mass.

The resin raw materials used in Examples are presented below.

(Epoxy Resin)

DER 858: oxazolidone ring-containing epoxy resin (trade name "DER 858" manufactured by Dow Chemical Company)

jER 152: phenol novolak type epoxy resin (trade name "jER 152" manufactured by Mitsubishi Chemical Corporation)

jER 828: bisphenol A type epoxy resin (trade name "jER 828" manufactured by Mitsubishi Chemical Corporation)

Preliminarily reacted epoxy resin 1: one obtained by mixing jER 828 and SEIKACURE-S (4,4'-diaminodiphenyl sulfone manufactured by SEIKA CORPORATION) at 100:9 (unit: parts by mass), heating the mixture at 150° C., and preliminarily reacting the heated mixture so as to have a viscosity of 9 Pa·s measured at 90° C. using a B type viscometer Preliminarily reacted epoxy resin 2: one obtained by mixing jER 828 and SEIKACURE-S (4,4'-diaminodiphenyl sulfone manufactured by SEIKA CORPORATION) at 100:9 (unit: parts by mass), heating the mixture at 150° C., and preliminarily reacting the heated mixture so as to have a viscosity of 3 Pa·s measured at 90° C. using a B type viscometer 2021P: alicyclic epoxy resin (product name "CELLOXIDE 2021P" manufactured by Daicel Corporation)

EXA-1514: bisphenol S type epoxy resin (trade name "EPICLON EXA-1514" manufactured by DIC Corporation)

TSR-400: epoxy resin having an oxazolidone ring skeleton (trade name "EPICLON TSR-400" manufactured by DIC Corporation)

N-740: phenol novolak type epoxy resin (trade name "EPICLON N-740" manufactured by DIC Corporation)

(Curing Agent and Curing Accelerator)

DICY 7: dicyandiamide (trade name "jER Cure DICY7" manufactured by Mitsubishi Chemical Corporation)

Omicure 24: toluene bis(dimethyl urea) (trade name "Omicure 24" manufactured by PTI Japan Corporation)

2MZA-PW: 2,4-diamino-6-[2'-methylimidazolyl-(1')]-ethyl-s-triazine (trade name "2MZA-PW" manufactured by SHIKOKU CHEMICALS CORPORATION)

(Thermoplastic Resin)

VW-10700: polyethersulfone (trade name "Virantage VW-17000" manufactured by SOLVAY)

SUMIKAEXCEL 5003P: polyethersulfone (trade name "SUMIKAEXCEL 5003P" manufactured by Sumitomo Chemical Co., Ltd.)

E2020P: polyethersulfone (trade name "ULTRASON E2020P" manufactured by BASF SE)

(Thermoplastic Resin Particles)

Vestosint 2159: polyamide 12 particles (product name "Vestosint 2159" manufactured by Evonik)

LP-3202: acrylic polymer (trade name "Dianal LP-3202" manufactured by Mitsubishi Rayon Co., Ltd.)

Example 1

(Preparation of Thermosetting Resin Composition)

A paste-like master batch was obtained by mixing jER 152 and DICY7 at a mass ratio of 1:1 and uniformly dispersing the mixture using a triple roll mill. In the same manner, a paste-like master batch was obtained by mixing jER 152 and Omicure 24 at a mass ratio of 1:1 and uniformly dispersing the mixture using a triple roll.

DER 858 and jER 152 excluding the amount used in the master batch were weighed in a flask so as to be at the ratio presented in Table 1 and uniformly melted at 120° C. The melt thus obtained was cooled to about 60° C., the master batches described above were added thereto, and the mixture was stirred until to be uniform, thereby obtaining a thermosetting resin composition 1.

(Fabrication of Tow Prepreg)

A tow prepreg was fabricated using 34-700 24K (tensile strength: 4830 MPa, tensile modulus of elasticity: 234 GPa) which was manufactured by Mitsubishi Rayon Carbon Fiber and Composites Inc. and had 24,000 filaments as a reinforcing fiber bundle.

Specifically, the reinforcing fiber bundle was sent out from the creel, allowed to pass through an opening bar heated to have a surface temperature of about 110° C., and widened from 11 mm to 15 mm in width. The reinforcing fiber bundle thus widened was brought into contact with a touch roll coated with the thermosetting resin composition 1 heated to about 60° C. and the thermosetting resin composition 1 was attached to the reinforcing fiber bundle. The reinforcing fiber bundle to which the thermosetting resin composition 1 was attached was allowed to pass through an impregnating roll heated to about 80° C. to impregnate the thermosetting resin composition 1 into the interior of the reinforcing fiber bundle, and then the impregnated reinforcing fiber bundle passed through a roll with grooves so that the tow width was adjusted to about 6 mm and then wound onto a paper tube using a winder, thereby fabricating a tow prepreg. Incidentally, the amount of the thermosetting resin composition 1 attached to the reinforcing fiber bundle (namely, the resin content in the tow prepreg) was adjusted to 34% by mass by adjusting the clearance between the doctor blade and the touch roll.

Example 2

(Preparation of Thermosetting Resin Composition)

A paste-like master batch was obtained by mixing jER 828 and DICY7 at a mass ratio of 1:1 and uniformly dispersing the mixture using a triple roll mill. In the same manner, a paste-like master batch was obtained by mixing jER 828 and Omicure 24 at a mass ratio of 1:1 and uniformly dispersing the mixture using a triple roll.

The preliminarily reacted epoxy resin 1 and jER 828 excluding the amount used in the master batch were weighed in a flask so as to be at the ratio presented in Table 1 and uniformly melted at 80° C. The melt thus obtained was cooled to about 60° C., the master batches described above were added thereto, and the mixture was stirred until to be uniform, thereby obtaining a thermosetting resin composition 2.

(Fabrication of Tow Prepreg)

A tow prepreg was fabricated in the same manner as in Example 1 except that the thermosetting resin composition 2 was used.

Example 3

(Preparation of Thermosetting Resin Composition)

A paste-like master batch was obtained by mixing jER 828 and DICY7 at a mass ratio of 1:1 and uniformly dispersing the mixture using a triple roll mill. In the same manner, a paste-like master batch was obtained by mixing jER 828 and Omicure 24 at a mass ratio of 1:1 and uniformly dispersing the mixture using a triple roll.

jER 828 and VW-10700 were weighed in a flask at a mass ratio of 11:1 and melted at 150° C. until to be uniform.

The preliminarily reacted epoxy resin 2 and the melt of jER 828 and VW-10700 were weighed in a flask and uniformly melted at 80° C. The melt thus obtained was cooled to about 60° C., the master batches described above were added thereto, and the mixture was stirred until to be uniform, thereby obtaining a thermosetting resin composition 3.

(Fabrication of Tow Prepreg)

A tow prepreg was fabricated in the same manner as in Example 1 except that the thermosetting resin composition 3 was used.

Example 4

(Preparation of Thermosetting Resin Composition)

A paste-like master batch was obtained by mixing jER 828 and DICY7 at a mass ratio of 1:1 and uniformly dispersing the mixture using a triple roll mill. In the same manner, a paste-like master batch was obtained by mixing jER 828 and 2MZA-PW at a mass ratio of 1:1 and uniformly dispersing the mixture using a triple roll.

TSR-400, N-740, and jER 828 excluding the amount used in the master batch were weighed in a flask so as to be at the ratio presented in Table 1 and uniformly melted at 120° C. The melt thus obtained was cooled to about 60° C., the master batches described above were added thereto, and the mixture was stirred until to be uniform, thereby obtaining a thermosetting resin composition 4.

(Fabrication of Tow Prepreg)

A tow prepreg was fabricated in the same manner as in Example 1 except that the thermosetting resin composition 4 was used.

Example 5

(Preparation of Thermosetting Resin Composition)

A paste-like master batch was obtained by mixing jER 828 and DICY7 at a mass ratio of 1:1 and uniformly dispersing the mixture using a triple roll mill. In the same manner, a paste-like master batch was obtained by mixing jER 828 and 2MZA-PW at a mass ratio of 1:1 and uniformly dispersing the mixture using a triple roll.

A paste-like master batch was obtained by mixing jER 828 and LP-3202 at a mass ratio of 1:1 and uniformly dispersing the mixture using a triple roll mill.

TSR-400, N-740, and jER 828 excluding the amount used in the master batch were weighed in a flask so as to be at the ratio presented in Table 1 and uniformly melted at 120° C. The melt thus obtained was cooled to about 60° C., the master batches described above were added thereto, and the mixture was stirred until to be uniform, thereby obtaining a thermosetting resin composition 5.

(Fabrication of Tow Prepreg)

A tow prepreg was fabricated in the same manner as in Example 1 except that the thermosetting resin composition 5 was used.

Example 6

(Preparation of Thermosetting Resin Composition)

A paste-like master batch was obtained by mixing jER 828 and DICY7 at a mass ratio of 1:1 and uniformly dispersing the mixture using a triple roll mill. In the same manner, a paste-like master batch was obtained by mixing jER 828 and 2MZA-PW at a mass ratio of 1:1 and uniformly dispersing the mixture using a triple roll.

TSR-400, N-740, and jER 828 excluding the amount used in the master batch were weighed in a flask so as to be at the ratio presented in Table 1 and uniformly melted at 120° C. The melt thus obtained was cooled to about 60° C., the master batches described above were added thereto, and the mixture was stirred until to be uniform, thereby obtaining a thermosetting resin composition 6.

(Fabrication of Tow Prepreg)

A tow prepreg was fabricated in the same manner as in Example 1 except that the thermosetting resin composition 6 was used, PYROFIL™ TRW40 50 L (tensile strength: 4120 MPa, tensile modulus of elasticity: 240 GPa) which was manufactured by Mitsubishi Rayon Co., Ltd. and had 50,000 filaments was used as a reinforcing fiber bundle, and the width of the tow prepreg was adjusted to about 12 mm.

Comparative Example 1

(Preparation of Thermosetting Resin Composition)

A paste-like master batch was obtained by mixing jER 828 and DICY7 at a mass ratio of 1:1 and uniformly dispersing the mixture using a triple roll mill. In the same manner, a paste-like master batch was obtained by mixing jER 828 and Omicure 24 at a mass ratio of 1:1 and uniformly dispersing the mixture using a triple roll.

The preliminarily reacted epoxy resin 1 and jER 828 excluding the amount used in the master batch were weighed in a flask so as to be at the ratio presented in Table 1 and uniformly melted at 80° C. The melt thus obtained was cooled to about 60° C., the master batches described above were added thereto, and the mixture was stirred until to be uniform, thereby obtaining a thermosetting resin composition 7.

(Fabrication of Tow Prepreg)

A tow prepreg was fabricated in the same manner as in Example 1 except that the thermosetting resin composition 7 was used.

Comparative Example 2

(Preparation of Thermosetting Resin Composition)

The raw materials were weighed in a flask so as to be at the ratio presented in Table 1 and melted at 150° C. until to be uniform, thereby obtaining a thermosetting resin composition 8.

(Fabrication of Tow Prepreg)

A tow prepreg was fabricated in the same manner as in Example 1 except that the thermosetting resin composition 8 was used, and the temperature of the touch roll was set to 80° C., and the temperature of the impregnating roll was set to 100° C.

It was difficult to wind the tow prepreg thus fabricated onto a paper tube since the tow prepreg was too hard and it was impossible to fabricate a tow prepreg having a length sufficient to pass through an automatic lamination apparatus.

Comparative Example 3

(Preparation of Thermosetting Resin Composition)

A paste-like master batch was obtained by mixing jER 828 and Vestosint 2159 at a mass ratio of 1:1 and uniformly dispersing the mixture using a triple roll mill.

jER 828 and E2020P were weighed in a flask at a mass ratio of 2:1 and melted at 150° C. until to be uniform.

The preliminarily reacted epoxy resin 1 and the melt of jER 828 and E2020P, and the master batch described above were weighed in a flask and uniformly melted at 80° C., thereby obtaining a thermosetting resin composition 9.

(Fabrication of Tow Prepreg)

A tow prepreg was fabricated in the same manner as in Example 2 except that the thermosetting resin composition 9 was used.

Incidentally, in Comparative Example 2 and Comparative Example 3, a tow prepreg was fabricated only for confirming the tackiness/drape property and the automatic lamination apparatus passing property and the thermosetting resin composition 8 and the thermosetting resin composition 9 did not contain a curing agent. In Comparative Example 2, the tow prepreg exhibited too low drape property, thus it was difficult to wind the tow prepreg onto a bobbin and the evaluation on the automatic lamination apparatus passing property was not carried out.

<Evaluation on Properties of Thermosetting Resin Composition>

(Measurement of Viscosity)

The thermosetting resin compositions prepared in the respective Examples and Comparative Examples were subjected to the measurement of temperature-programmed viscosity as follows. The viscosities at 30° C. and 45° C. were read in the measurement results thus obtained. In addition, the minimum viscosity during the temperature rise process was read.

Apparatus: AR-G2 (manufactured by TA Instruments)
Used plate: parallel plate with diameter of 25 mm
Plate gap: 0.5 mm
Frequency of vibrations measured: 10 rad/sec
Rate of temperature rise: 2.0° C./min
Stress: 300 Pa (Curing Completion Time of Thermosetting Resin Composition)

The curing completion time at 140° C. was measured in conformity to JIS K6300 under the following conditions. Incidentally, the curing completion time was defined as the time required until the inclination of the tangential line to the torque-time curve became 1/20 of the maximum value after the inclination became the maximum value.

Measuring instrument: CURELASTOMETER 7 Type P manufactured by JSR Trading Co., Ltd.
Frequency of vibrations: 100 cpm
Angle of amplitude of vibrations: ±1/4°
Dice shape: WP-100

<Evaluation on Properties of Tow Prepreg>

The tack value at 23° C., the tack value at 45° C., and the drape value at 23° C. were measured by the following methods, respectively.

[Tack Value at 23° C.]

The average maximum stress value to be obtained through a probe tack test conducted under the following conditions was taken as the tack value at 23° C.

(Probe Tack Testing Conditions)
Apparatus: Tack Tester TA-500 (manufactured by UBM)
Contact area of plunger with sample: 3.1 cm$^2$
Plunger pushing time: 10 seconds
Plunger pushing pressure: 90 kPa
Plunger lifting speed: 1 mm/sec
Temperature of sample stage: 23° C.

Procedure:
1) The tow prepreg was fixed on the sample stage.
2) The plunger was pushed against the tow prepreg for 10 seconds by applying a downward pressure of 90 kPa.
3) The plunger was lifted at the speed of 1 mm/sec.
4) The maximum value of the stress value while lifting the plunger was taken as the maximum stress value, the measurement was conducted three times in total, and the average value of the maximum stress values thus obtained was taken as the average maximum stress value.

[Tack Value at 45° C.]

The tack value at 45° C. was measured by the same measurement method as in the tack value at 23° C. except that the temperature of sample stage was set to 45° C. and the plunger pushing pressure was set to 150 kPa.

[Drape Value at 23° C.]

A tow prepreg cut into a length of 250 mm was placed on the upper surface of a horizontal test stand, and a portion 200 mm distant from the tip of the tow prepreg was projected in the air. An aluminum plate was placed on the remaining 50 mm portion and a weight of about 100 g was placed thereon and fixed so as not to move during the measurement.

The angle formed by the test stand and the hung tow prepreg in 30 seconds after the tow prepreg is held so as to be horizontal, then released from the holding, and hung down was taken as the drape value θ(°). Incidentally, the angle formed by the test stand and the hung tow prepreg refers to the angle formed by a line 1 and a line 2 where the line 1 denotes the horizontal line on the upper surface of the test stand and the line 2 denotes the line connecting the tip point of the test stand and the "point at which a circle which has a radius of 90 mm and takes the tip of the test stand as the center intersects the tow prepreg". The temperature at the time of measurement was set to 23° C.

<Automatic Lamination Apparatus Passing Property>

The tow prepreg was subjected to a placement test using STAXX Compact 1700 manufactured by BA Composites. The unwinding speed was set to 13 m/min and the temperature of the laminating roll was set to 40° C. Whether the tow prepreg was able to be smoothly unwound from the paper tube, whether twining of tow prepreg occurred while the tow prepreg passed through the roll in the automatic lamination apparatus, and whether displacement and peeling off of the tow prepreg in the laminate occurred were respectively judged. As a comprehensive evaluation, ○ was granted in a case in which the automatic lamination apparatus passing property was favorable and × was granted in a case in which yarn breakage and fluffing occurred when the tow prepreg was unwound from the paper tube or twining of tow prepreg occurred while the tow prepreg passed through the roll in the automatic lamination apparatus and displacement and peeling off of the tow prepreg in the laminate occurred.

TABLE 1

| | Raw materials | | Form | Unit | Example 1 | Example 2 | Example 3 | Example 4 | Example 5 |
|---|---|---|---|---|---|---|---|---|---|
| Amount blended in thermosetting resin composition | Thermosetting resin | jER152 | Liquid | (Parts by mass) | 54 | | | | |
| | | jER828 | Liquid | | | 20 | 20 | 32.5 | 32.5 |
| | | 2021P | Liquid | | | | | | |
| | | DER858 | Solid | | | 38 | | | |
| | | TSR-400 | Solid | | | | | 42.5 | 42.5 |
| | | EXA-1514 | Solid | | | | | | |
| | | N-740 | Semisolid | | | | | 25 | 25 |
| | | Preliminarily reacted epoxy resin 1 | Solid | | | | 80 | | |
| | | Preliminarily reacted epoxy resin 2 | Solid | | | | | 80 | |
| | | Sum | | (Parts by mass) | 92 | 100 | 100 | 100 | 100 |
| | | Proportion of liquid | | | 59% | 20% | 20% | 33% | 33% |
| | | Proportion of solid | | | 41% | 80% | 80% | 68% | 68% |
| | Curing agent and curing auxiliary | DICY7 | | | 7.5 | 5 | 5 | 5 | 5 |
| | | 2MZA-PW | | | | | | 3.5 | 3.5 |
| | | Omicure24 | | | | 3 | 4 | 4 | |
| | Thermoplastic resin | VW-10700 | | | | | 1 | | |
| | | 5003P | | | | | | | |
| | | E2020P | | | | | | | |
| | Thermoplastic resin particles | LP-3202 | | | | | | | 3 |
| | | Vestosint2159 | | | | | | | |
| Carbon fiber | | | | — | 34-700 24K | 34-700 24K | 34-700 24K | 34-700 24K | 34-700 24K |
| Resin content | | | | (%) | 34.2 | 35.3 | 36.9 | 33.3 | 33.1 |
| Properties of thermosetting resin composition | Viscosity at 30° C. | | | (Pa · s) | 1.90E+04 | 2.10E+04 | 1.40E+04 | 1.50E+04 | 1.60E+04 |
| | Viscosity at 45° C. | | | (Pa · s) | 511 | 528 | 375 | 339 | 363 |
| | Minimum viscosity | | | (Pa · s) | 0.59 | 1.01 | 0.89 | 0.30 | 0.80 |
| | Curing-completed time at 140° C. | | | (min) | 7.5 | 7.5 | 4.6 | 5.0 | 5.4 |
| Properties of tow prepreg | Tack value at 23° C. | | | (kPa) | 36 | 33 | 40 | 36 | 34 |
| | Tack value at 45° C. | | | (kPa) | 45 | 40 | 79 | 41 | 56 |
| | Drape value at 23° C. | | | (°) | 31 | 27 | 29 | 25 | 37 |
| | Yarn breakage and fluffing at time of unwinding | | | — | Non-occurrence | Non-occurrence | Non-occurrence | — | — |
| | Twining around roll | | | — | Non-occurrence | Non-occurrence | Non-occurrence | — | — |
| | Displacement and peeling off of laminate | | | — | Non-occurrence | Non-occurrence | Non-occurrence | — | — |
| | Automatic lamination apparatus passing property | | | — | ○ | ○ | ○ | — | — |

| | Raw materials | | Form | Unit | Example 6 | Comparative Example 1 | Comparative Example 2 | Comparative Example 3 |
|---|---|---|---|---|---|---|---|---|
| Amount blended in thermosetting resin composition | Thermosetting resin | jER152 | Liquid | (Parts by mass) | | | | |
| | | jER828 | Liquid | | 32.5 | 30 | 40 | 47 |
| | | 2021P | Liquid | | | | 13 | |
| | | DER858 | Solid | | | | | |
| | | TSR-400 | Solid | | 42.5 | | | |
| | | EXA-1514 | Solid | | | | 50 | |
| | | N-740 | Semisolid | | 25 | | | |
| | | Preliminarily reacted epoxy resin 1 | Solid | | | 70 | | 60 |
| | | Preliminarily reacted epoxy resin 2 | Solid | | | | | |
| | | Sum | | (Parts by mass) | 100 | 100 | 103 | 107 |
| | | Proportion of liquid | | | 33% | 30% | 51% | 44% |
| | | Proportion of solid | | | 68% | 70% | 49% | 56% |
| | Curing agent and curing auxiliary | DICY7 | | | 5 | 5 | | |
| | | 2MZA-PW | | | 3.5 | | | |
| | | Omicure24 | | | | 4 | | |
| | Thermoplastic resin | VW-10700 | | | | | | |
| | | 5003P | | | | | 15 | |
| | | E2020P | | | | | | 10 |
| | Thermoplastic resin particles | LP-3202 | | | | | | |
| | | Vestosint2159 | | | | | | 9 |
| Carbon fiber | | | | — | TRW40 50L | 34-700 24K | 34-700 24K | 34-700 24K |
| Resin content | | | | (%) | 33 | 32.5 | 31.4 | 34.2 |
| Properties of | Viscosity at 30° C. | | | (Pa · s) | 1.50E+04 | 6.70E+03 | 1.10E+05 | 2.70E+04 |

TABLE 1-continued

| | | | | | | |
|---|---|---|---|---|---|---|
| thermosetting resin composition | Viscosity at 45° C. | (Pa · s) | 339 | 196 | 4776 | 1635 |
| | Minimum viscosity | (Pa · s) | 0.30 | 0.74 | — | — |
| | Curing-completed time at 140° C. | (min) | 5.0 | — | — | — |
| Properties of tow prepreg | Tack value at 23° C. | (kPa) | 25 | 94 | <0.1 | 21 |
| | Tack value at 45° C. | (kPa) | 38 | 45 | 24 | 30 |
| | Drape value at 23° C. | (°) | 16 | 41 | 3 | 12 |
| | Yarn breakage and fluffing at time of unwinding | — | — | — | Occurrence | Non-occurrence |
| | Twining around roll | — | — | — | Occurrence | Non-occurrence |
| | Displacement and peeling off of laminate | — | — | — | Non-occurrence | Occurrence |
| | Automatic lamination apparatus passing property | — | — | — | × | × |

The invention claimed is:

1. A prepreg tape comprising a reinforcing fiber bundle impregnated with a thermosetting resin composition, wherein
   a tack value measured at 23° C. and a plunger pushing pressure of 90 kPa is from 5 to 40 kPa,
   a tack value measured at 45° C. and a plunger pushing pressure of 150 kPa is from 35 to 100 kPa,
   a drape value at 23° C. is from 10° to 40°,
   the prepreg tape includes unidirectional fibers arranged along a length direction of the prepreg tape, and
   the thermosetting resin composition has a viscosity of from $1.0 \times 10^4$ to $1.0 \times 10^5$ Pa·s at 30° C. and a viscosity of from $1.0 \times 10^2$ to $6.0 \times 10^2$ Pa·s at 45° C.

2. The prepreg tape according to claim 1, wherein the thermosetting resin composition has a curing completion time of from 2.0 to 15.0 minutes at 140° C. when the curing completion time is measured using a resin hardening instrument.

3. The prepreg tape according to claim 1, wherein the thermosetting resin composition has a minimum viscosity of from 0.3 to 20 Pa·s when the viscosity is measured at a rate of temperature rise of 2.0° C./min and a temperature range having the minimum viscosity of from 100° C. to 120° C.

4. The prepreg tape according to claim 1, wherein a content rate of the thermosetting resin composition with respect to a mass of the prepreg tape is from 20% to 45% by mass.

5. The prepreg tape according to claim 1, wherein an average width of the prepreg tape is from 2 to 30 mm.

6. The prepreg tape according to claim 1, wherein a number of filaments in the reinforcing fiber bundle is from 1,000 to 60,000.

7. The prepreg tape according to claim 1, wherein the thermosetting resin composition contains (A) an epoxy resin and (B) a curing agent.

8. The prepreg tape according to claim 7, wherein the thermosetting resin composition further contains (C) a curing accelerator.

9. The prepreg tape according to claim 7, wherein (A) the epoxy resin contains an epoxy resin which is solid at room temperature and an epoxy resin which is liquid at room temperature.

10. The prepreg tape according to claim 9, wherein the epoxy resin which is solid at room temperature contains a preliminary reaction product of a bisphenol A epoxy resin with 4,4'-diaminodiphenyl sulfone.

11. The prepreg tape according to claim 9, wherein the epoxy resin which is liquid at room temperature contains a phenol novolak epoxy resin or a bisphenol A epoxy resin.

12. The prepreg tape according to claim 8, wherein a content of (B) the curing agent is from 3 to 10 parts by mass and a content of (C) the curing accelerator is from 0.5 to 10 parts by mass with respect to 100 parts by mass of (A) the epoxy resin in the thermosetting resin composition.

13. The prepreg tape according to claim 8, wherein
   (B) the curing agent is at least one kind of compound selected from the group consisting of an amine curing agent and an amine adduct curing agent, and
   (C) the curing accelerator is at least one kind of compound selected from the group consisting of a urea derivative and an imidazole derivative.

14. The prepreg tape according to claim 8, wherein
   (B) the curing agent is at least one compound selected from the group consisting of diaminodiphenylmethane sulfone, diaminodiphenyl sulfone, aliphatic amine, dicyandiamide, tetramethylguanidine, a thiourea adduct amine, and isomers and modified products thereof, and
   (C) the curing accelerator is at least one compound selected from the group consisting of a urea derivative and an imidazole derivative.

15. A fiber-reinforced composite material comprising the cured prepreg tape according to claim 1.

16. A laminate comprising the laminated prepreg tape according to claim 1.

17. An automatic lamination molding method, the method comprising laminating the prepreg tape according to claim 1 after imparting adhesive property to the prepreg tape through heating.

18. A method of manufacturing a fiber-reinforced composite material, the method comprising heating and pressing one obtained by laminating the prepreg tape according to claim 1 in a mold.

* * * * *